US006901011B2

(12) United States Patent
Micheloni et al.

(10) Patent No.: US 6,901,011 B2
(45) Date of Patent: May 31, 2005

(54) SELF-REPAIR METHOD VIA ECC FOR NONVOLATILE MEMORY DEVICES, AND RELATIVE NONVOLATILE MEMORY DEVICE

(75) Inventors: Rino Micheloni, Turate (IT); Aldo Losavio, Bergamo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 2 days.

(21) Appl. No.: 10/417,416

(22) Filed: Apr. 15, 2003

(65) Prior Publication Data

US 2003/0231532 A1 Dec. 18, 2003

(30) Foreign Application Priority Data

Apr. 15, 2002 (EP) .............................................. 02425231

(51) Int. Cl.[7] .............................................. G11C 16/06
(52) U.S. Cl. ........................... 365/185.22; 365/185.09; 365/185.28; 365/185.29
(58) Field of Search ....................... 365/185.22, 185.09, 365/185.28, 185.29

(56) References Cited

U.S. PATENT DOCUMENTS

| | | | |
|---|---|---|---|
| 5,818,791 A | 10/1998 | Tanaka et al. ......... | 365/230.06 |
| 5,928,370 A * | 7/1999 | Asnaashari .................. | 714/48 |
| 6,236,609 B1 | 5/2001 | Tanzawa et al. ............ | 365/218 |
| 6,418,051 B2 * | 7/2002 | Manstretta et al. .... | 365/185.09 |
| 6,442,080 B2 | 8/2002 | Tanzawa et al. ....... | 365/189.09 |
| 6,459,628 B1 | 10/2002 | Bautista, Jr. et al. ....... | 365/194 |
| 6,498,752 B1 * | 12/2002 | Hsu et al. .............. | 365/185.22 |

* cited by examiner

*Primary Examiner*—Hoai Ho
(74) *Attorney, Agent, or Firm*—Lisa K. Jorgenson; Robert Iannucci; Seed IP Law Group PLLC (57) ABSTRACT

The method for using a nonvolatile memory (1) having a plurality of cells (14), each of which stores a datum, is based upon the steps of performing an modification operation of erasing/programming (22) the data of the memory; verifying (23) the correctness of the data of the memory cells; and, if the step of verifying (23) has revealed at least one incorrect datum, correcting on-th-field (46) the incorrect datum, using an error correcting code. The verification (23) of the correctness of the data is performed by determining (23) the number of memory cells storing an incorrect datum; if the number of memory cells storing the incorrect datum is less than or equal to a threshold (46), the erroneous datum is corrected by the error correction code; otherwise, new erasing/programming pulses are supplied.

21 Claims, 6 Drawing Sheets

SELF-REPAIR METHOD VIA ECC FOR NONVOLATILE MEMORY DEVICES, AND RELATIVE NONVOLATILE MEMORY DEVICE

The present invention relates to a self-repair method using ECC for nonvolatile memory devices, and the corresponding nonvolatile memory device.

As is known, in a semiconductor multimegabit nonvolatile memory device (EPROM or flash), the cell array constitutes a substantial fraction, accounting for between 40% and 70% of the total area. The applications for which nonvolatile memories are designed impose the need for perfect functionality of all the cells in the array during the operation of the device (reading, programming and erasing).

In theory, the presence of at least one cell that does not operate correctly is sufficient for the entire memory device to be unusable. This condition is of considerable importance during the process of industrial fabrication of this type of integrated device, in so far as there exists a non-zero likelihood of failure of a memory cell in any given production lot.

In the absence of solutions for detecting and correcting failure bits, the likelihood of having devices with perfectly operating memory cells in a given production lot would be very low and hence unacceptable from the point of view of large scale industrial production. This value indicates the so-called "prime yield" of the lot and represents a figure of merit of the production process.

In order to increase the yield of memory devices in the final production steps, circuit solutions have been employed for recognizing and correcting the failure bits. A technique commonly adopted for this purpose uses additional memory cells to those forming the memory array, that are designed to replace corresponding failed array cells. The used cells, defined as redundant cells or redundancy cells, are identical to the array cells. They must be appropriately managed by additional circuits to those already normally present inside the device.

In particular, the organization of the memory favors the use of entire rows or entire columns made up of redundant cells, such as to replace corresponding rows or columns of the array even in the presence of just one failed cell. In this way, a compromise is reached between the power for correcting the failures and the area required for the circuits managing the redundancy.

Usually, activation of redundancy occurs during the electrical wafer sorting (EWS) step, during which, using an appropriate test flow, the cells that present some problem are identified and replaced with the redundancy cells. The redundancy, whether row redundancy or column redundancy, is thus able to correct only the defects that occur at time zero, i.e., in the factory.

For instance, should a sensible reduction in gain arise for a given cell, on account of cycling, the cell could no longer be able to get over the erasing and programming steps, so causing breakdown of the entire device.

Furthermore, error correction techniques are known which enable recognition and correction of errors revealed during reading. In particular, the error correction code (ECC) is currently used for in-field intervention when a cell varies its charge content as a result of retention or of a reading stress.

Figure 1A:
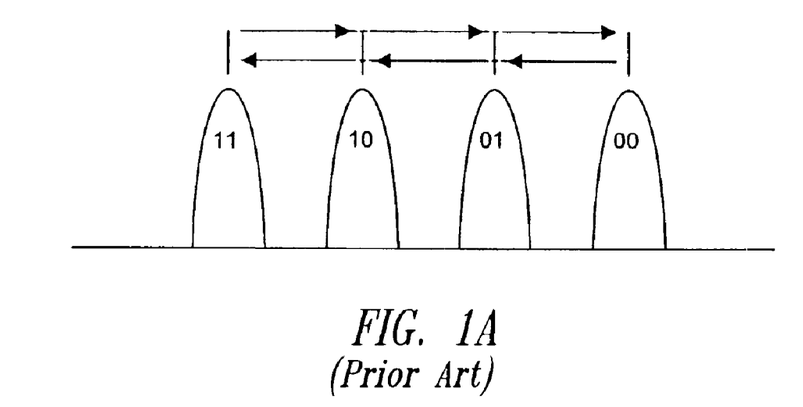
FIGS. 1a and 1b show the displacement undergone by the threshold voltage distributions of memory cells on account of stress phenomena occurring during operation.
Figure 1B:
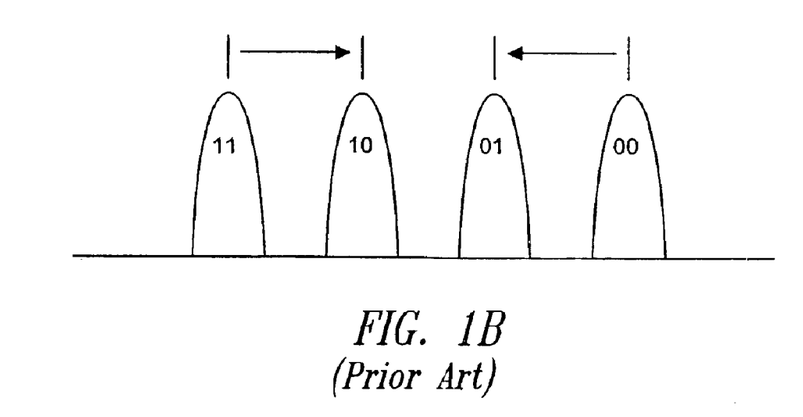

The phenomenon of retention affects cells with higher thresholds and is due to imperfections in the insulation oxides (ONO and tunnel oxides) which cause a loss of electrons from the floating gate. Reading stress is instead peculiar to lower threshold configurations: as a result of the voltage applied on the control gate during the read operations, the cell ends up gaining charge and hence sees and increase of the own threshold voltage. The effects described are the more destructive, the closer together are the distributions and the higher the voltages, as occurs, for example, in multilevel memories. ECCs mainly find a use in multilevel memories for correcting the above mentioned problems during the life of the device. According to the degree of coverage that is required in terms of error correction, the number and type of correctable displacements varies. FIG. 1a shows the case where a cell can migrate from the original distribution to any other distribution. In FIG. 1b only the local displacement on two distributions is contemplated.

Figure 2:
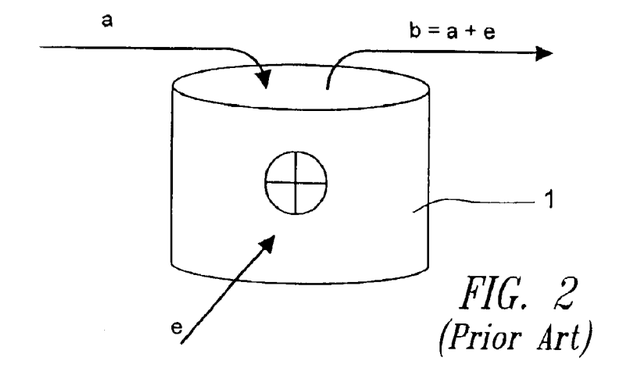
FIG. 2 illustrates a block diagram which represents the data flow in a flash memory.

As is known, an error correction code (ECC) is used when, during a generic transfer of information during reading or writing the memory, a datum b at output from the memory is corrupted with respect to the input datum a, on account of possible errors e present in the flow of writing, information retention, or reading, as represented schematically in FIG. 2, where reference number 1 designates a flash memory.

Figure 3:
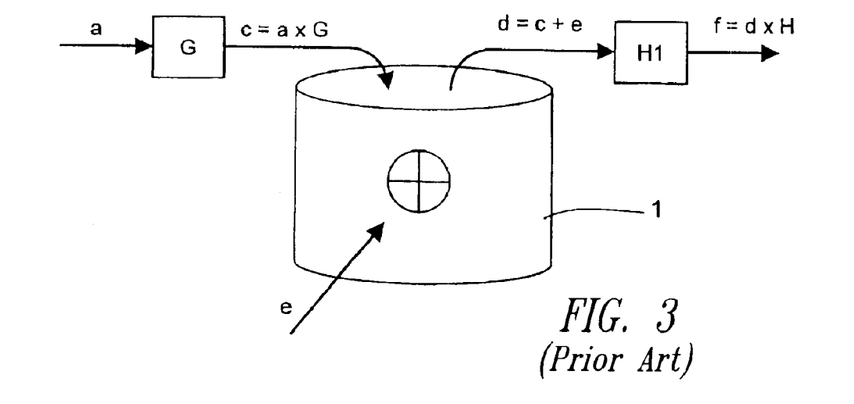
FIG. 3 is a block diagram similar to that of FIG. 2 in the presence of an error correction system.

In order to reduce the statistical incidence of such an event, techniques are described in the literature which, adopting an appropriate encoding of information when it is being written in the memory and a maximum likelihood decoding, enable estimation of the original datum even in the presence of an error. A block diagram of the above techniques is shown in FIG. 3, where G represents an encoder of an input datum a, e represents the error, c represents the datum encoded prior to its storage in the nonvolatile memory 1, d represents the corrupted datum just read, H1 represents a maximum likelihood decoder, and f is the output datum.

Provided in the literature are numerous examples on how to build such codes, encoders and decoders, which consequently will not be described in detail herein.

Figure 4:
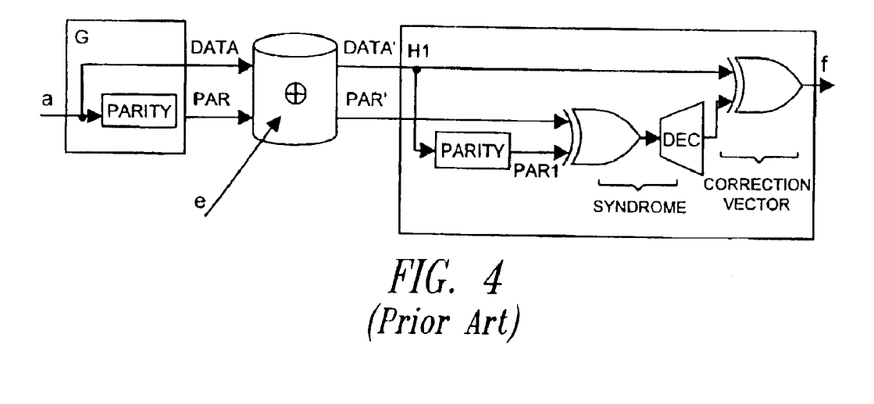
FIG. 4 is a more detailed block diagram of an error correction system.

FIG. 4 illustrates an embodiment of an ECC corrector usable in the case of a memory internally organized with words of, for example, 64 bits, and with a linear encoding of a Hamming (64/71) type, capable of correcting one error.

In the ECC corrector of FIG. 4, the 64 data bits are encoded by the encoder G in a 64+7-bit word (systematic code), the first 64 bits of which are simply the replica of the input data a (DATA) and the remaining 7 bits (PAR) are generated using an appropriate parity array starting from the input data themselves.

The decoder H1 generates the syndrome as comparison between the parity PAR1 calculated on the data read DATA' and the stored parity PAR'. On the basis of a maximum likelihood criterion, the decoder H1 applies the possible corrections on the data vector. In this way, the output datum f, decoded and corrected, is obtained.

At present, at the end of a programming or erasing it is verified whether all the cells (both array and parity cells) are in the right position, and the presence of even just one cell that is not behaving as expected is not allowed. This means that, if there is, for instance, one cell the drain contact whereof has opened during the life of the device, the memory as a whole is considered failed and has to be thrown away.

The aim of the present invention is thus to provide a method for solving the problems of failure that occur during operation of the memory and are detected at the end of an erasing or programming operation.

According to the invention, a method and a nonvolatile memory device are provided as defined in claims 1 and 10, respectively.

In practice, according to the invention, an error correction is activated immediately at the end of a reading or erasing operation, should one or more of the cells fail to be in the required condition. In particular, the error correction is activated when the number of cells storing an incorrect datum is lower than a preset threshold.

For an understanding of the present invention there are now described preferred embodiments thereof, purely by way of nonlimiting example, with reference to the attached drawings, wherein.

The invention is based upon the activation of in-field self-repair and/or self-replacement procedures by the memory itself when, during writing and/or erasing, one or more failed cells are detected. The above procedures thus enable subsequent continuation of use of the memory, without having to discard it.

In particular, the present invention relates to a self-correction procedure using an ECC technique and applying the block diagram of FIG. 4. The correction is implemented independently of the error correcting code chosen and hence independently of the type of corruption existing. The error correcting code chosen must, however, be able to correct the error and not simply to detect it.

According to the present self-repair procedure, after erasing/programming, when an error is detected, the number of incorrect bits is detected and, if the error regards a single cell, the correction and then a new verification are performed.

Figure 5:
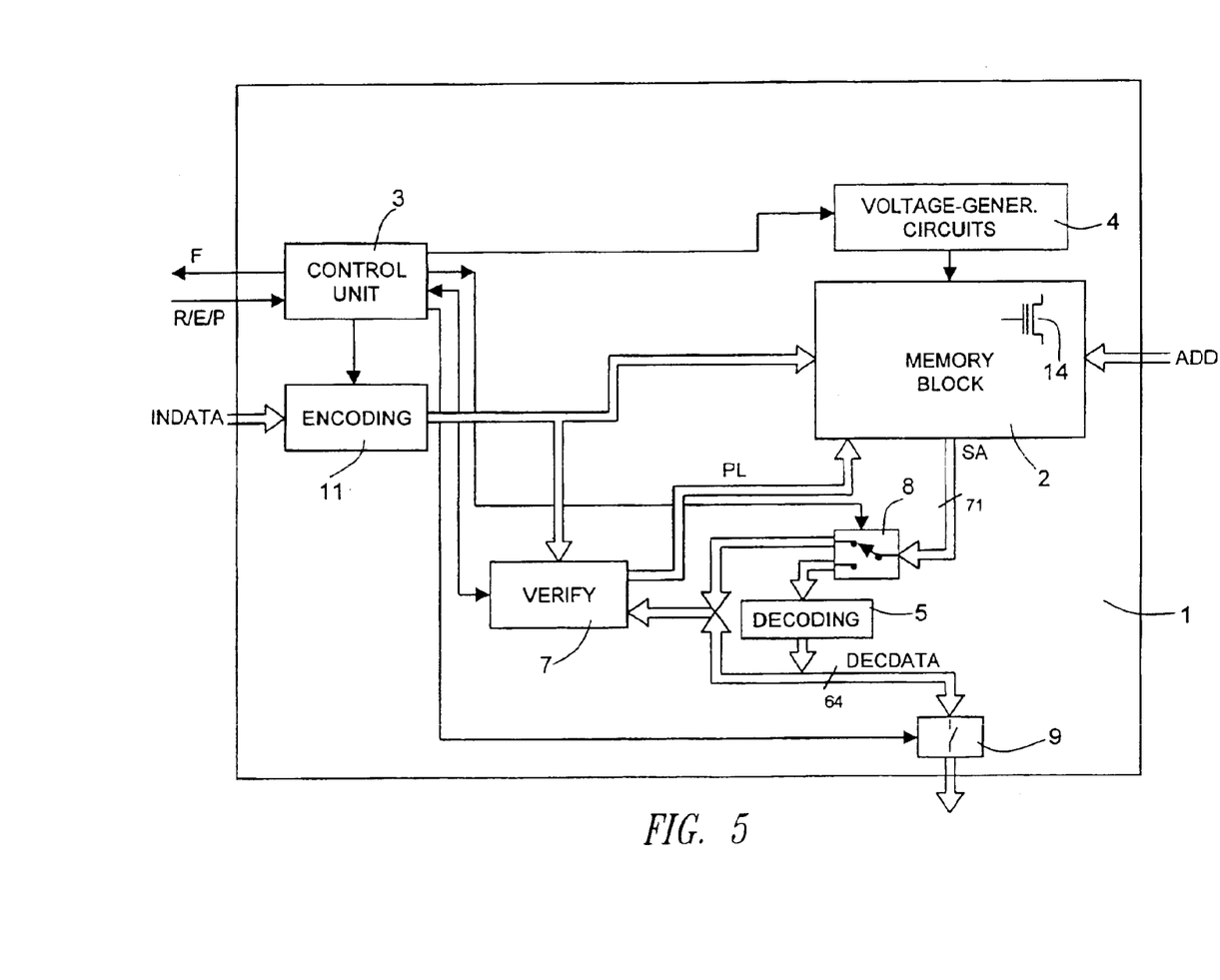
FIG. 5 is a block diagram of a memory implementing a self-correction procedure using an ECC technique, according to a second embodiment of the invention.
Figure 6:
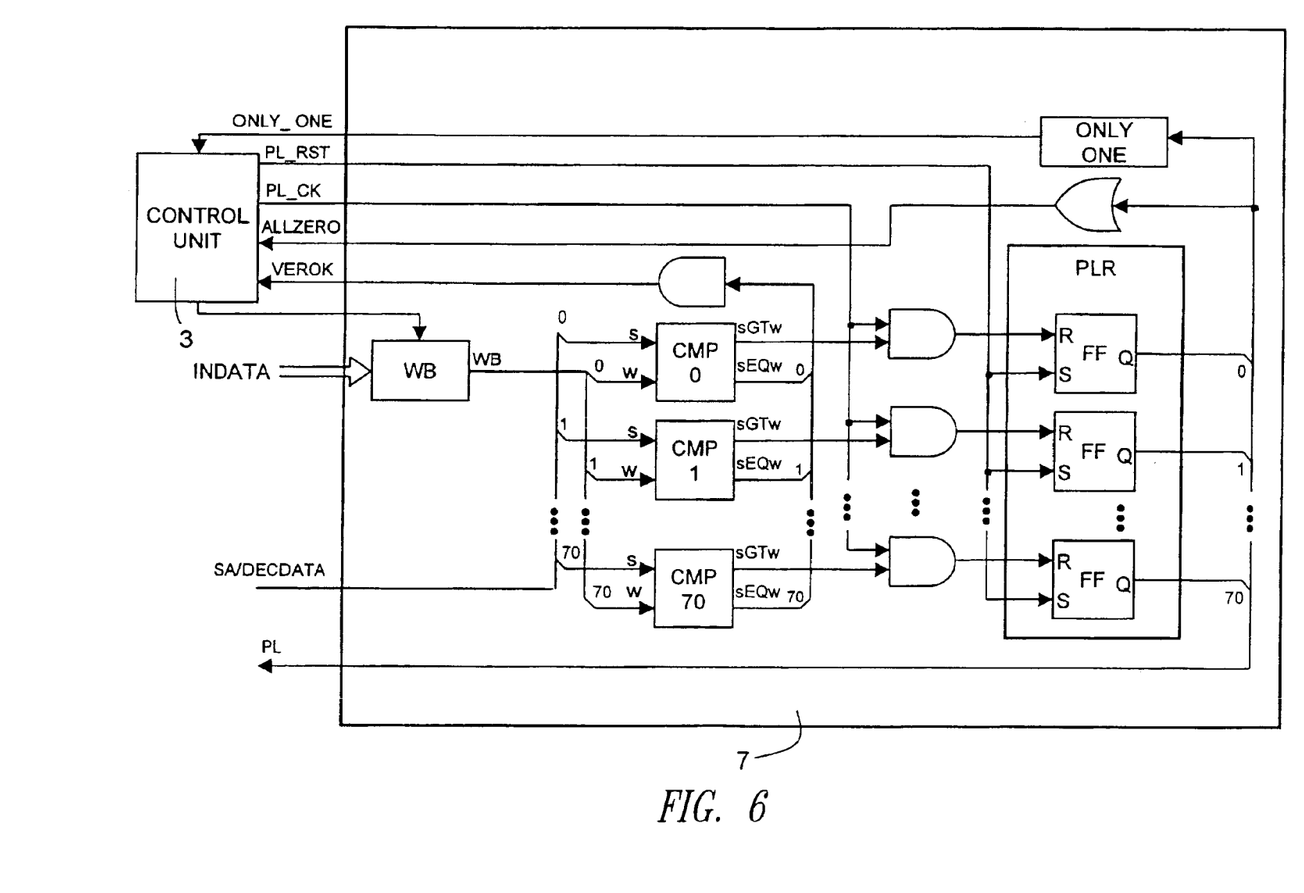
FIG. 6 is a more detailed diagram of a block of FIG. 5.

A block diagram of a memory 1 with self-repair using ECC in programming/erasing is illustrated in FIG. 5, where an encoding block 11 (corresponding to the encoder G of FIG. 4 and implemented by a software or hardware module) receives input data INDATA and, after encoding them, transfers them to a memory block 2. The memory block 2 comprises, in a known way, a memory array formed by a plurality of nonvolatile cells 14 (just one of which is shown in FIG. 5), row and column addressing circuits and read circuits (sense amplifier). The input encoded data are further supplied to a programming state verifying and storing block 7, the structure of which is illustrated in FIG. 6. This block has the function of verifying the correctness of the data written/erased and of storing the programming state of the individual cells of the memory block 2 in a volatile way.

A control unit 3 receives from outside signals R/E/P for the operation (reading, erasing, programming) that is to be performed, sends out a failed memory signal F, and controls biasing voltage generating circuits 4, which supply the appropriate biasing to the memory block 2.

The memory block 2 outputs 71-bit read data SA (64 data bits plus 7 error correction bits). The read data SA are supplied, via a switch 8, to the programming state verifying and storing block 7 or to a decoding block 5 corresponding to the maximum likelihood decoder H1 of FIG. 4. The decoding block 5 generates a 64-bit decoded word (DECDATA) supplied to the programming state verifying and storing block 7 and to the switch 9. The latter outputs the decoded data DECDATA upon a command received from the control unit 3.

Figure 7:
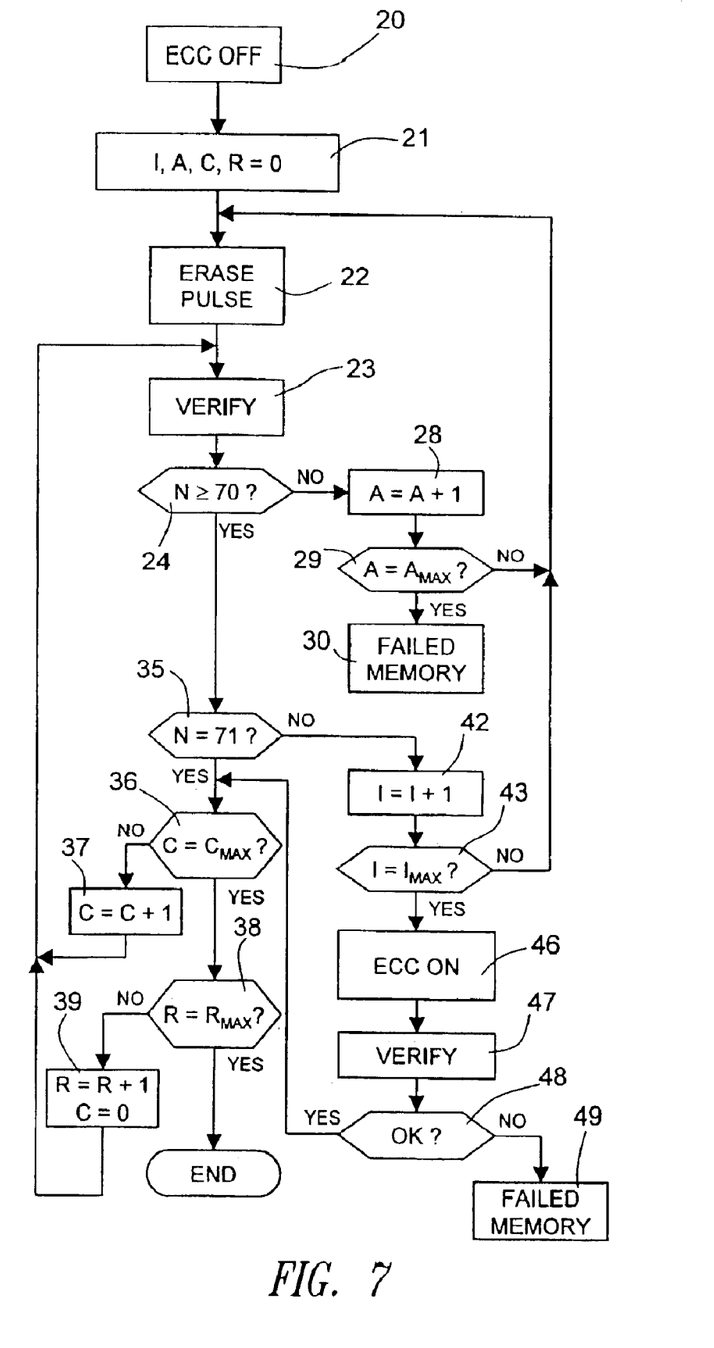
FIGS. 7 and 8 are flowcharts for erasing and programming, respectively, performed using the ECC technique self-correction procedure according to the invention.
Figure 8:
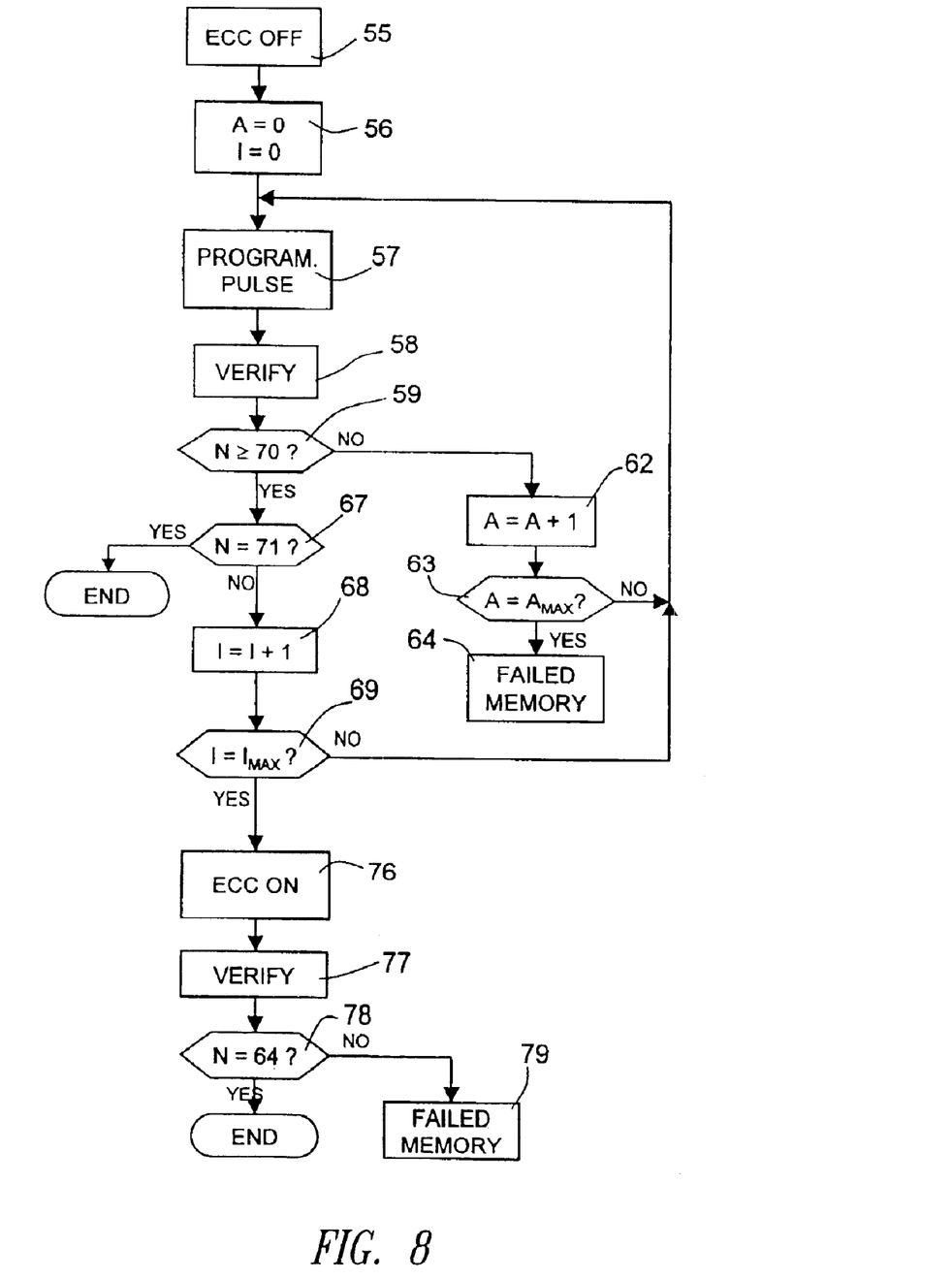

The switch 8 is controlled by the control unit 3, which exchanges control signals and result-of-verification signals with the programming state verifying and storing block 7, and controls the switch 8 according to the erasing and programming procedures illustrated in FIGS. 7 and 8.

The memory 1 is further provided with a traditional redundancy structure, activated during the EWS step (not illustrated). The programming state verifying and storing block 7 generates control signals PL supplied to the memory block 2 for controlling the internal switches of the memory block, which in turn control the application of further programming pulses to the corresponding memory cells in a per se known manner.

FIG. 6 illustrates a more detailed diagram of the programming state verifying and storing block 7.

Specifically, the data to be written in the memory block 2 (data INDATA supplied from outside during a programming operation; bits "1" in the case of an erasing operation generated following upon a special control signal issued by the control unit 3) are stored in a write buffer WB, which stores one word or page at a time.

A programming state register PLR comprises a plurality of memory elements (one for each bit, represented in FIG. 6 by flip-flops FF).

During the programming step, each memory element FF maintains the information for the programming state of the respective cell and is active (i.e., it controls a switch that enables supply of the programming voltage to the corresponding cell; for example, it has a logic level "1") when the cell requires further programming pulses, and is inactive (for example, it has a logic level "0"), if the cell is correctly programmed. Likewise, during erasing, the memory elements FF maintain the information whether the respective cell has been correctly erased or not; in the latter case, they do not activate the switches of the cells. In practice, depending upon which memory element FF is active (or which elements are active), the programming state register PLR maintains the information regarding which cells are not operating at the end of an erasing or programming operation, as is described hereinafter with reference to the flowcharts of FIGS. 7 and 8.

The outputs of all the memory elements FF are connected to a combinatorial circuit ONLY ONE, which has the function of signalling when, during programming or erasing, only one cell has remained unwritten or not correctly erased. The combinatorial circuit ONLY ONE generates a binary signal ONLY_ONE, which has a first value only when just one memory element FF supplies the information that the corresponding cell requires further programming or erasing pulses; otherwise, it presents a second value. The outputs of the memory elements FF are moreover connected to an OR gate, which outputs a register state signal ALLZERO. This signal communicates to the control unit 3 when all the memory elements FF of the programming state verifying and storing block 7 have been deactivated and hence all the corresponding cells are correctly programmed or erased. The contents of the memory elements FF are updated by the control unit 3 after each operation of verification by means of an updating signal PL_CK.

Before activation of the ECC, the programming state verifying and storing block 7 receives the 71 bits of the read word SA and outputs the 71 bits of the control signals PL fed to the memory block 2 being programmed. Upon activation of the ECC, the programming state verifying and storing block 7 receives the 64 bits of the decoded datum DEC-DATA. In this case, the last 7 memory elements FF are deactivated by the control unit 3.

In both cases, each bit of a read word SA supplied by the memory block 2 or each bit of the decoded datum DEC-DATA is compared with the respective bit stored in the write buffer WB by the comparators CMP, which each supply an equality signal sEQw and an overprogramming signal sGTw. The equality signal sEQw is equal to "1" if the corresponding bit SA coincides with the one present in the write buffer WB. The overprogramming signal sGTw is equal to "1" if the two bits are equal or else when the cell has been erroneously overprogrammed. Also in this case, prior to activation of the ECC, all the comparators CMP are operative and, following upon activation of the ECC, only the first 64 are working.

The verify signal VEROK is active when all the bits of the read word SA or all the bits of the decoded datum DECDATA at that moment verified correspond to the ones present in the write buffer WB.

Before activation of the ECC, the control unit 3 initializes all the memory elements FF, setting them in the active state, and resets a counter that memorizes the number of executed programming pulses. After application of an erasing or programming pulse to the cells, the addressed cells are read, and the memory elements FF are updated via the updating signal PL_CK. If all the memory elements FF are deactivated (state-of-register signal ALLZERO="1"), there are no more cells requiring a programming pulse; furthermore, if all the read cells have the correct information content (verify signal VEROK active), there are no cells requiring a further programming/erasing pulse, and the programming/erasing operation terminates. If ALLZERO="1", but VEROK="0" (some cells overprogrammed), a malfunctioning signal is generated. If, instead, the signal ONLY_ONE is active, the error correction is activated, as is described hereinafter with reference to FIGS. 7 and 8.

FIG. 7 shows a flowchart of an erasing operation with ECC correction.

Initially, step 20, ECC correction is deactivated by sending a command to the switch 8 (FIG. 5), so as to supply the read data SA to the programming state verifying and storing block 7.

Next, step 21, an additional pulse counter I, an erasing pulse counter A, a column counter C, and a row counter R are set to zero.

Next, step 22, an erasing pulse is sent to an entire sector and then, step 23, a one first word (addressed by the counters R and C) is verified. Given that in this phase the error correction is deactivated, verify simply consists in verifying that all the 71 bits of the read word SA are equal to "1".

If the result of the verify is positive for fewer than 70 cells (i.e., there are at least two cells that have not been erased correctly, output NO from block 24), the erasing pulse counter A is incremented, step 28, and a verification is made to see whether the maximum number of erasing pulses ($A_{MAX}$) has been reached, step 29. If the maximum number has been reached (output YES from block 29), a failed memory signal F is generated, step 30, and the procedure terminates. If, instead, the result is negative (output NO from block 29), a new erasing pulse is supplied, step 22.

When verifying has yielded a positive result for at least 70 cells (all the verified cells are in the correct position except for one, output YES from block 24), a check is made to see whether all the cells of the verified word have been erased (N=71, step 35). If the result is YES, step 35, a check is made to see whether all the columns have been verified. If the result is negative, step 37, the column counter C is incremented and verifying is performed at step 23.

If all the columns have been verified (output YES from step 36), a check is made to see whether all the rows have been verified, step 38. If the result is negative, step 39, the row counter R is incremented and the column counter C is reset to zero, and verifying is carried out at step 23. If the result is positive, the erasing procedure terminates.

When, at the end of verifying (step 23) only one cell has remained that is not erased (output NO from step 35), the additional pulse counter I is incremented, step 42, and a check is made to see whether this is equal to the maximum number $I_{MAX}$, step 43. If the result is negative (output NO from step 43), a new erasing pulse is supplied, so returning to step 22. If the result is positive (output YES from step 43), the error correction is activated, step 46. Activation of the correction by the control unit 3 (FIG. 5) determines switching of the switch 8, so that the 71 bits of the read data SA are supplied to the decoder block 5, which decodes them, generating the 64 bits of the decoded datum DECDATA, which are supplied to the programming state verifying and storing block 7. In this step, then, the programming state verifying and storing block 7 works only on 64 bits.

A new verifying is carried out, step 47. In this case, the verification consists in checking whether the 64 bits of the correct word DECDATA have the desired value (all "1"). If the result of the verification is positive (output YES from step 48), the procedure goes back to step 36 to proceed with the verify reading on other words. If the result is negative (output NO) a failed memory signal F is generated, step 49, and the procedure terminates.

FIG. 8 illustrates a flowchart of a programming operation with ECC correction.

Initially, step 55, ECC correction is activated, sending a command to the switch 8 (FIG. 5), so as to supply the read data SA to the programming state verifying and storing block 7.

Next, step 56, an additional pulse counter I and a programming pulse counter A are set to zero.

Next, step 57, a programming pulse is sent to the word addressed (in a way of itself known), and, step 58, the programmed word is verified. In this case the verifying consists simply in checking that each bit has the programming value envisaged, comparing the 71 bits of the read word SA one by one with the 71 bits of the word to be programmed, supplied by the encoding block 11 of FIG. 5.

If the result of the verification is positive for fewer than 70 cells (i.e., there are at least two cells not properly programmed, output NO from block 58), the programming pulse counter A is incremented, step 62, and a check is made to see whether the maximum number of programming pulses ($A_{MAX}$) has been reached, step 63. If the maximum number has been reached (output YES from block 63), a failed memory signal F is generated, step 64, and the procedure terminates. If, instead, the result is negative (output NO from block 63), a new programming pulse is supplied, step 57.

When the result of the verification in step 58 is positive (output YES from block 59), a check is made to see whether all the cells of the word programmed have been correctly programmed (N=71, step 67). If the result is YES, the programming procedure terminates. If the result is negative (when at the end of the verify reading just one cell has remained insufficiently programmed or overprogrammed, output NO from step 67), the additional pulse counter I is incremented (step 68), and a check is made to see whether this is equal to the maximum number $I_{MAX}$ step 69. If the result is negative (output NO from step 69), a new programming pulse is supplied, so returning to step 57. If the result is positive (output YES from step 69), the error correction is activated, step 76. Also in this case, activation of the correction by the control unit 3 (FIG. 5) determines switching of the switch 8, so that the 71 bits of the read data SA are supplied to the decoder block 5, which decodes them, generating the 64 bits of the decoded datum DECDATA, which are supplied to the programming state verifying and storing block 7. In this step, then, the programming state verifying and storing block 7 works only on 64 bits.

A new verify reading is then carried out, step 77. In this case, the verification consists in checking whether the 64 bits of the correct word DECDATA have the desired programming value, corresponding to that of the respective bit of the input datum INDATA. If the result of the verification is positive (output YES from step 78), the procedure terminates.

If the result is negative (output NO), a failed memory signal F is generated, step 79, and the programming procedure terminates.

Reading of the memory block 2 is performed using a normal known ECC algorithm, for example keeping the switch 8 in the position of connection of the decoding block 5, and is hence not described in detail herein.

The method and the memory device described herein thus enable in-field self-repair of the memory during normal operation after an erasing or programming operation, when, after a standard maximum number of erasing/programming pulses has been supplied, it has not been possible to store a datum correctly, so overcoming the need to consider the memory device failed and hence to be replaced. In fact, with known memory devices provided with ECC, without the possibility of activating the ECC also during erasing or programming of the cells, the error could be corrected only during reading. When, however, it was necessary to erase or write the cell, the contents of which had been corrected via ECC, the verification algorithm, by revealing the error, declared the entire memory failed. With the memory device according to the invention, instead, the error can be corrected also during programming or erasing, thus preventing failure of the memory.

The self-correction method can in any case be applied also in the EWS test step in the factory with the aim of simplifying its flow. In particular, the memory device could generate by itself the various patterns to be used for verifying its functionality and then proceed, once again by itself, to the correction. The possibility of application, during EWS, proves for example useful in those cases in which the standard testing is very costly or complicated, for instance in devices used for storing images. In such cases, in fact, frequently the EWS test is not implemented, and it is not possible to discriminate failed devices that cannot be self-repaired from correctly functioning devices that can be self-repaired.

Finally, it is clear that numerous modifications and variations may be made to the method and memory device described and illustrated herein, all of which fall with the scope of the present invention, as defined in the attached claims. In particular, even though the foregoing description always refers to the correction of a single error, in the event of the correction code enabling the correction of more than one error, the method and memory device can be adapted in such a way as to carry out in-field self-correction of more than one error, following upon an erasing or programming operation. The solution described can moreover be used with words of any length.

What is claimed is:

1. A method for using a nonvolatile memory including a plurality of memory cells, each of which stores a datum, comprising the steps of:
    carrying out a modification operation on the data of said memory, said modification operation being chosen between erasing and programming; and
    performing a first verification by verifying the correctness of the data of said memory cells; and
    if the step of verifying has revealed an incorrect datum in one of the memory cells, correcting in-the-field said incorrect datum without writing a correct datum in the one of the memory cells.

2. The method according to claim 1, in which said step of correcting in-the-field the incorrect datum comprises applying an error correcting code.

3. The method according to claim 2, in which said step of verifying the correctness of the data comprises: determining the number of memory cells storing an incorrect datum; wherein, if the number of memory cells storing an incorrect datum is less than or equal to a threshold, then performing the step of correcting in-the-field said incorrect datum through said error correcting code.

4. The method according to claim 3, in which after said step of correcting the incorrect data, the steps are performed of:
    performing a second verification by verifying the correctness of the data;
    if said second verification yields a result indicating an error, generating an error signal.

5. The method according to claim 3 wherein said threshold is equal to 1.

6. The method according to claim 3 wherein, prior to said step of correcting said incorrect datum, the steps are performed of:
    verifying whether a maximum number of modification pulses has already been supplied; and
    if a maximum number of modification pulses has not already been supplied, supplying a modification pulse, wherein if a maximum number of modification pulses has already been supplied, performing said step of correcting said incorrect datum.

7. The method according to claim 4 wherein said modification operation is an operation of erasing carried out on the plurality of memory cells; said first verification step of verifying the correctness of the data is carried out on a subset of said plurality of memory cells; and wherein if said first verification step yields a correct result on all of said subset, said first verification step of verifying the correctness of the data is repeated on other subsets of said plurality of memory cells, until complete verification of said plurality of memory cells.

8. The method according to claim 1 wherein said modification operation is a programming operation performed on the plurality of memory cells.

9. The method according to claim 1 wherein said step of carrying out a modification operation is performed during an electrical wafer sorting test step.

10. A nonvolatile memory device, comprising:
    a memory block comprising a plurality of memory cells, each of which stores a datum;
    modification means for modifying the data of said memory cells, said modification means performing an operation chosen between programming and erasing; and correctness verifying means of the data of said memory cells, said correctness verifying means generating an incorrect datum signal if at least one incorrect datum is detected;

means for correcting data in-the-field using an error correcting code, said means for correcting data being enabled in response to the incorrect datum signal generated by said correctness verifying means.

11. The device according to claim 10 wherein said correctness verifying means comprise a detection circuit structured to detect memory cells that store an incorrect datum; said device further comprising a correction activation unit, connected to said detection circuit and generating a correction activation signal when the number of memory cells storing an incorrect datum is less than or equal to a threshold; and a decoding unit enabled by said correction activation signal for correcting incorrect data using an error correcting code.

12. The device according to claim 11, further comprising means for verifying correct data supplied by said decoding unit, said means for verifying correct data generating an error signal in the event of a result indicating an error being detected.

13. The device according to claim 10 wherein said correction activation unit comprises means for recognizing a maximum number of pulses, which are enabled when the number of memory cells storing an incorrect datum is less than or equal to a threshold, and generating information on a maximum number of modification pulses; the device further comprising modification pulse generating means enabled in the absence of said correction activation signal.

14. A method for using a nonvolatile memory including a plurality of memory cells, comprising:

writing input data to the memory cells;

verifying whether the input data written to the memory cells was written correctly; and if the verifying step has revealed that an incorrect datum was written to one of the memory cells, correcting the incorrect datum without writing a correct datum to the one of the memory cells containing the incorrect datum.

15. The method of claim 14 wherein the writing step is part of an erase operation.

16. The method of claim 14 wherein the verifying step includes temporarily storing the input data in a write buffer and comparing data actually stored in the memory cells by the writing step with the input data stored in the write buffer.

17. The method of claim 14, further comprising:

verifying whether the correct datum written to the one of the memory cells was written correctly; and if the correct datum was not written correctly to the one of the memory cells, then generating an error signal.

18. The method of claim 14 wherein, prior to the step of correcting the incorrect datum, the steps are performed of:

verifying whether a maximum number of modification pulses has already been supplied; and if a maximum number of modification pulses has not already been supplied, supplying a modification pulse, wherein the step of correcting the incorrect datum is performed only if the maximum number of modification pulses has already been supplied.

19. The method of claim 14 wherein the writing step is part of an erase operation and the verifying step includes:

verifying a first subset of the plurality of memory cells;

verifying a second subset of the plurality of memory cells only after the step of verifying the first subset confirms that the data written to the memory cells of the first subset was written correctly.

20. The method of claim 14 wherein the writing step includes applying a first modification pulse to the one of the memory cells and the correcting step includes applying a second modification pulse to the one of the memory cells.

21. The device of claim 10, wherein the incorrect datum is corrected without writing a correct datum in one of the memory cells containing the incorrect datum.

* * * * *